(12) United States Patent
Moggridge et al.

(10) Patent No.: US 12,436,032 B2
(45) Date of Patent: *Oct. 7, 2025

(54) SYSTEM, METHOD AND APPARATUS FOR WIDE WAVELENGTH RANGE IMAGING WITH FOCUS AND IMAGE CORRECTION

(71) Applicant: WESTBORO PHOTONICS INC., Ottawa (CA)

(72) Inventors: Timothy Moggridge, Ottawa (CA); Paul Joseph Prior, Ottawa (CA)

(73) Assignee: Westboro Photonics Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,167

(22) Filed: Jun. 1, 2022

(65) Prior Publication Data
US 2022/0299369 A1 Sep. 22, 2022

Related U.S. Application Data

(63) Continuation of application No. 16/852,243, filed on Apr. 17, 2020, now Pat. No. 11,359,966.

(Continued)

(51) Int. Cl.
*G01J 3/40* (2006.01)
*G01J 3/02* (2006.01)
(Continued)

(52) U.S. Cl.
CPC .............. *G01J 3/40* (2013.01); *G01J 3/0208* (2013.01); *G01J 3/04* (2013.01); *G01J 3/2803* (2013.01);
(Continued)

(58) Field of Classification Search
CPC .......... G01J 3/40; G01J 3/2803; G01J 3/2823; G01J 3/0208; G01J 3/04; G01J 3/0235;
(Continued)

(56) References Cited

U.S. PATENT DOCUMENTS 5,986,758 A * 11/1999 Lyons .................... G01J 3/2803
356/326
6,031,619 A * 2/2000 Wilkens .................... G01J 3/36
250/226

(Continued)

OTHER PUBLICATIONS

Jin Choi, T. H. Kim, H. J. Kong, and Jong Ung Lee, "Zoom lens design for a novel imaging spectrometer that controls spatial and spectral resolution individually," Appl. Opt. 45, 3430-3441 (2006) (Year: 2006).*

(Continued)

*Primary Examiner* — Kara E. Geisel
*Assistant Examiner* — Jonathon Cook
(74) *Attorney, Agent, or Firm* — Damien G. Loveland; Valuetech Patent Agency Inc.

(57) ABSTRACT

A variable focus imaging lens assembly has different, calibrated settings for each of multiple different wavelength ranges. Images are captured for each wavelength range using the different settings, corrected and stacked to form an image data cube. Using multiple wavelength ranges allows a scene or object to be imaged by multispectral imagers, hyperspectral imagers and imaging spectrometers using an overall wide wavelength range.

19 Claims, 10 Drawing Sheets

Related U.S. Application Data

(60) Provisional application No. 62/835,284, filed on Apr. 17, 2019.

(51) Int. Cl.
*G01J 3/04* (2006.01)
*G01J 3/28* (2006.01)

(52) U.S. Cl.
CPC ..... *G01J 3/2823* (2013.01); *G01J 2003/2813* (2013.01); *G01J 2003/2826* (2013.01)

(58) Field of Classification Search
CPC ................ G01J 3/51; G01J 2003/2813; G01J 2003/2826; G01N 2021/3174; G01N 2021/6471
See application file for complete search history.

(56) References Cited

U.S. PATENT DOCUMENTS

| | | | | |
|---|---|---|---|---|
| 6,399,397 | B1* | 6/2002 | Zarling | G01N 33/588 436/805 |
| 9,071,737 | B2* | 6/2015 | Blayvas | H04N 23/843 |
| 2013/0057753 | A1* | 3/2013 | Gillet | G03B 13/36 348/E5.045 |
| 2015/0051498 | A1* | 2/2015 | Darty | G01J 3/2803 600/407 |
| 2015/0234150 | A1* | 8/2015 | Katsunuma | G01J 3/28 348/360 |
| 2016/0003675 | A1* | 1/2016 | Abolbashari | G02B 27/0075 356/326 |
| 2017/0340212 | A1* | 11/2017 | Lin | G16H 30/40 |
| 2018/0112966 | A1* | 4/2018 | Matsumiya | G01J 5/0896 |
| 2018/0288340 | A1* | 10/2018 | Gillet | G01J 3/0237 |
| 2019/0182440 | A1* | 6/2019 | Xin | G01J 3/51 |
| 2019/0339126 | A1* | 11/2019 | Lemieux | G01J 3/0208 |
| 2020/0310100 | A1* | 10/2020 | Ozcan | G03H 1/0443 |

OTHER PUBLICATIONS

Jin Choi, T. H. Kim, H. J. Kong, and Jong Ung Lee, "Zoom lens design for a novel imaging spectrometer that controls spatial and spectral resolution individually," Appl. Opt. 45, 3430-3441 (Year: 2006).*

* cited by examiner $$\frac{1}{o} + \frac{1}{i} = \frac{1}{f} \quad \text{Lens equation}$$

Linear magnification:

$$M = \frac{-i}{o} = \frac{h'}{h}$$

SYSTEM, METHOD AND APPARATUS FOR WIDE WAVELENGTH RANGE IMAGING WITH FOCUS AND IMAGE CORRECTION

TECHNICAL FIELD

The subject matter of the present invention relates to digital imaging. In particular, it relates to a system and method for spectral imaging that ensures optimal focus and image correction across a wide range of wavelengths.

BACKGROUND

A spectrometer includes any electro-optical instrument that measures properties of light as a function of wavelength. A spectroradiometer is a spectrometer which is calibrated to measure the spectral power distribution of electromagnetic radiation incident upon the instrument's input optics. Typical radiometric quantities for spectroradiometer calibration include radiance, irradiance, radiant intensity, radiant flux or radiant exitance. The term spectrometer or imaging spectrometer includes all types of spectroradiometer or imaging spectroradiometer variants. An imaging spectrometer includes any electro-optical instrument that generates a plurality of spectrally-resolved images of an object or scene, wherein each image represents a different range of wavelengths irradiating the object or scene, and wherein each range or "band" of wavelengths may vary from 100 nanometers or more to less than one nanometer. A compact spectrometer incudes any portable spectrometer.

There are four basic techniques of acquiring three-dimensional hyperspectral cubes: spatial scanning, spectral scanning (push broom), non-scanning (snapshot) and spatiospectral scanning. Spectral scanning hyperspectral imaging comprises capturing multiple images of a scene using a sequence of narrowband spectral filters or illuminants and assembling the images into a spectral data cube, wherein the pixels of each image are spatially aligned. Hyperspectral imaging captures many spectral bands representing a contiguous spectrum for each pixel. Multispectral imaging captures a limited number of spectral bands, typically three to fifteen.

Digital color cameras are an example of multispectral imaging, wherein red, green, and blue images are captured using RGB (red, green, blue) color microfilters applied directly to the sensor pixels. Together, the three spectral bands sample the visible spectrum of approximately 400 nm to 700 nm (4,000 to 7,000 angstroms) (FIG. 1).

Spectral band filters refer to short pass, long pass or bandpass filters. They are any transmissive or reflective optical filter that reduces the spectral range of light after the filter.

Ideally, the image-forming optical glass components of a spectral imaging system maintains constant focus across the sum of the spectral bands. The focus point of a simple refractive lens, for example, does not maintain constant, but shifts with wavelength due to chromatic aberration (FIG. 2). To address this issue, a combination of lenses with different refractive indices are used to alleviate (but not eliminate) chromatic aberration. Achromatic lenses ensure that two wavelengths focus onto the same plane, while apochromatic lenses ensure that three wavelengths focus onto the same plane and superachromatic lenses do the same for four wavelengths (FIG. 3).

Achromatic lenses are typically sufficient for digital color photography where the visible spectrum is imaged, and where the design focus wavelengths range from approximately 450 nm (blue) to 615 nm (red). However, apochromatic lenses may be required for wide-band digital imaging in astronomy and other scientific applications, where the spectral range of interest may include ultraviolet and infrared radiation. While it may be difficult to find a suitable apochromatic lens for a wide wavelength range multispectral or hyperspectral application, it is far more probable that a photographic (achromatic) lens is available "off-the-shelf" with all of the other required attributes for the intended application: motorization and automation; field of view; F-stop; modulation transfer function and resolution; magnification; back focus distance; distortion; working distance; mounting format; image size; and price.

Suitable imaging sensors for multispectral and hyperspectral imagers include but are not limited to CCD (charge-coupled device), CMOS (complementary metal oxide semiconductor), and InGaAs arrays. These sensors typically have a functional wavelength range of 350 nm to 1050 nm (ultraviolet-A to near-infrared) for CCD and CMOS arrays, and 900 nm to 1650 nm (near-infrared) for InGaAs arrays.

The spectral transmittance of optical glasses used in commercial photographic lenses may seem to be adequate for imaging from 350 nm to 1700 nm, and so these achromatic lenses are often used for spectral imagers. However, they are not likely to be superachromatic over that range and so may produce considerably defocused images in some regions from ultraviolet and near-infrared regions of the spectrum.

The important feature of spectral scanning imagers is that the hyperspectral or multispectral data cube is acquired sequentially: one image at one wavelength at a time; whereas push broom spectrometers (FIG. 13 is one example) capture a line of spatial dimension and a line of spectrum at one time. To make a hyperspectral cube, the push broom spectrometer is translated or rotated relative to the scene or object to be imaged. Push broom spectrometers are well suited to applications where the scene is naturally translating such as airplanes, drones and satellites flying over the earth; or a continuous sheet of material moving over rollers in a web process. Many scenes are static, however, and are better suited to the spectral scanning imager technology. In spectral scanning imagers, the stray light performance achieved through optical filtering can be better than 10E-5. Push broom spectrometers might only have 10E-2 or 10E-3 out of band stray light rejection. Static scenes may use temporal HDR (high dynamic range) imaging. Push broom, spatial scanning imagers are typically intended for a sample in constant motion, which is not compatible with temporal HDR imaging. The spot or line spectrometers (the latter being an example of a push broom spatial scanning imager) in FIGS. 13 and 14 presuppose that the entire wavelength ranges of the spectrometers are indeed in focus at the spectrometer slits. Although this requirement will be understood by those skilled in the art, it is often the case that photographic lenses designed to be achromatic from 450-615 nm are used to measure much wider wavelength ranges.

Adjusting the lens focus may result in a change in image magnification (also known as "lateral color"). As shown in FIG. 4 for an ideal lens, the magnification is given by:

$$M = \frac{-i}{o} \qquad (1)$$

where M is the magnification, i is the distance from the lens center to the image plane, and o is the distance from the lens center to the imaged object. Thus, any movement of the lens center along the optical axis to correct for chromatic aberration may result in a change in image magnification.

Any change in the lens focus may further result in changes in radial distortion (either pincushion or barrel—FIG. 5) and image vignetting (FIG. 6). Depending on the structural rigidity, rotational symmetry, and axial alignment of all components in the lens assembly, any changes in the lens focus may also result in a slight but still significant image translation across the sensor array.

Any change in the lens focus will further result in changes in the spatial sensitivity of the optical system as measured by the 2-D sensor. These vignetting effects are a function of lens focus, lens focal length, lens iris and wavelength.

Existing spectral and spectral scanning imagers do not adjust the front objective lens focus for a plurality of spectral bands. If the lens focus is adjustable, the optical system is focused either manually or with an autofocus mechanism and not readjusted for multiple measurements at a unique working distance.

In U.S. Pat. No. 8,330,087, Domenicali discloses a system and method for adjusting the focus of relay lens elements as a function of wavelength in order to maintain focus, image magnification or both. However, Domenicali does not consider image registration stacking of separate images acquired for different spectral bands or disclose how to compensate for image magnification changes other than by optical means. The requirement of relay lenses further limits design options for the imaging optics.

Known calibration methods may be used to implement a lens calibration model that focuses an optical system for any object distance. However, these models do not include image registration, nor do they include multi-focus imaging for stacked spectral images.

Other known calibration methods exist to characterize image magnification and translation as a result of lens adjustment (focusing), but not as a function of wavelength.

Similar to the systems above, spectral scanning hyperspectral imagers described above, spectral imaging spot and line spectrometers employ objective optics to focus light into the device. FIGS. 13 and 14 detail examples of existing art wherein the objective optics are set to one lens setting to focus for a range of wavelengths imaged onto the array detector.

SUMMARY OF INVENTION

In view of the above, there is therefore a need for systems and methods to enable spectral or spectral scanning imaging systems to accurately image a wide wavelength range using optics that do not provide optimal focus across the desired wavelength range at any single focus setting. The system should employ optimum focus settings for each spectral band being imaged and, if necessary, compensate for any optical distortion resulting therefrom such that the images may be registered and stacked into a spectral data cube.

Included is a calibration for lens indexing to provide focus for each wavelength band. The registration for each wavelength band to a reference image is saved for each focus uniquely. There are sets of registration corrections created for each focus setting (lens indexing value) and iris. Focus between calibration points may also be used by interpolation of the registration corrections.

The methods described below can be used with apochromatic or non-apochromatic lenses to image a wide wavelength range with higher image resolution and higher quality.

Disclosed is a wide wavelength range imaging apparatus comprising: a variable focus assembly with one or more lenses; a two-dimensional array detector; means for measurement of two or more spectral bands, wherein the lens focus setting and image registration is calibrated for each spectral band.

Also disclosed is a wide wavelength range focused imaging system with integrated spot spectrometer comprising: a variable focus lens assembly with lenses; an optical spectrometer; and a spectral dataset compiled from shorter spectral segments taken at a multiple of focus settings.

DETAILED DESCRIPTION

A. Glossary

Where used herein, the term "wide wavelength range" refers to a wavelength range that is greater than 200 nm.

Depending on the embodiment, it refers, for example, to a wavelength range of 400-700 nm, 350-850 nm, 350 nm-1050 nm, or 900-1650 nm.

B. Exemplary Embodiments

The invention comprises a method, apparatus and system for adjusting the focus of a spectral imager lens assembly according to a calibration model that ensures optimum focus for a given spectral range. The calibration model further directs image transformations as required to ensure that the captured images at different spectral bands may be registered and stacked into a spectral data cube.

Figure 7:
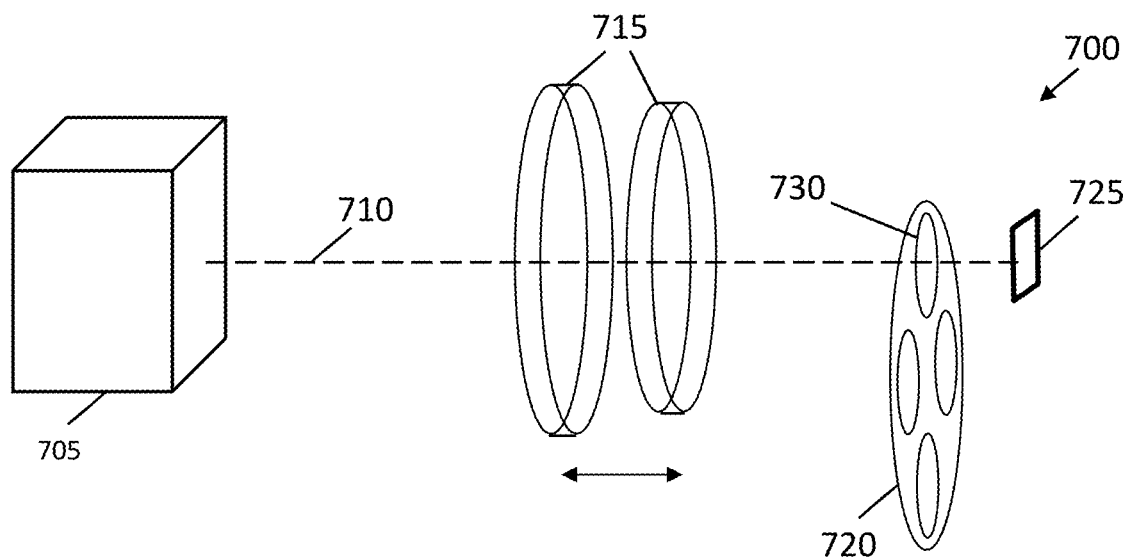
FIG. 7 illustrates a spectral scanning imaging system with spectral band filters and wavelength-dependent focusing via adjustable lens elements, according to an embodiment of the present invention.

An example spectral imager 700 is shown in FIG. 7, where an object (or scene) 705 is to be imaged. Centered on optical axis 710 is imaging lens assembly 715, filter wheel 720, and image sensor 725, wherein filter wheel 720 is comprised of two or more spectral band filters 730. In other embodiments, not shown, the functionality of the sequential filtering done by the filter wheel 720 and transmissive optical filters 730 may be replaced with a single tunable filter element such as an acousto-optical tunable filter (AOTF) or liquid crystal tunable filter (LCTF). The selection of multiple filters is not limited to a rotational selection of filters and could also include translation assemblies (not shown). Additionally, not shown are other arrangements where the position of the selective filtering element 720 and 730 is in front of the lens elements 715 or between a plurality of lens elements.

In operation, a digital image is sequentially captured by sensor array 725 for each spectral band filter 730, wherein one or more elements of lens assembly 715 are translated along the optical axis 710 to ensure constant focus of the image of object 705 on sensor array 725 for each spectral band filter.

As will be understood by those skilled in the art, the focus of a portion of object 705 on any given pixel of sensor array 725 is dependent on the depth of focus and the object focal plane. The objective of the invention is therefore to ensure that the elements of the lens assembly 715 are translated such that the focus of object 705 on any given pixel of sensor array 725 is maintained for successive (spectrally selected wavelength) images and over a wide wavelength range.

The elements of lens assembly 715 may be mechanically coupled such that the focus of the lens assembly is changed by linear and/or rotational motions.

In another embodiment, sensor array 725 may be translated along optical axis 710 to change the focus to compensate for chromatic aberration.

An automated adjustment of the lens assembly 715 or translation of the sensor array 725 may be digitally encoded so that the encoding position can be related to the "in-focus" setting for a particular object distance and for a particular spectral range.

In yet another embodiment, spectral band filter(s) 730 do not have the same optical path length. They may be comprised of a path-lengthening transparent or colored substrate, such as glass or polymer, that wholly or partially compensates for chromatic aberration between the spectral bands.

In another embodiment, not shown, the adjustable lens may also have a zoom function which, in combination with the lens focusing may be used to affect both the focus and magnification across two or more spectral bands. The focus setting may be part of the calibrations described; and the zoom setting may be one additional variable or part comprising the lens focus setting.

To ensure constant focus, the lens focus setting may be calibrated for each spectral band filter 730 and an enumerated range of object distances or lens zoom settings, and the focus settings saved in a lookup table. In operation, the lens assembly-object distance is determined and the appropriate focus setting for each filter interpolated or extrapolated from the nearest enumerated lens assembly-object distances. The values in the lookup table may also be fitted to a mathematical function such as a polynomial; and the function can be used instead of the lookup table to determine the required lens settings.

Figure 8:
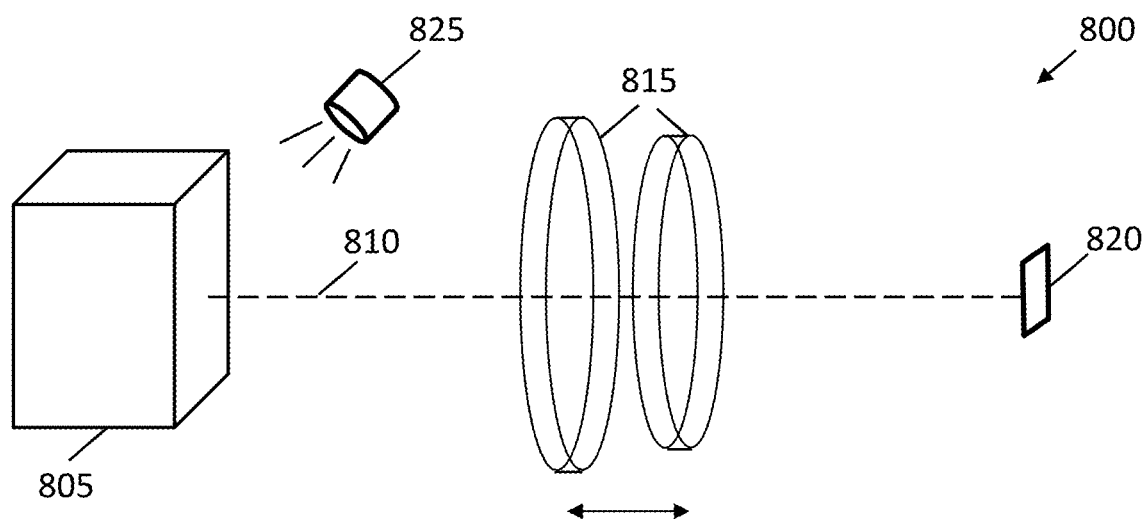
FIG. 8 illustrates a spectral scanning imaging system with narrowband spectral illumination and wavelength-dependent focusing lens elements, according to an embodiment of the present invention.

In another embodiment, an example spectral imager 800 is shown in FIG. 8, where the reflection or transmission of an object (or scene) 805 is to be imaged. For transmission, the illumination 825 backlights the sample 805 (not shown); and for reflection, the illumination 825 is front illuminating the sample 805, as shown in FIG. 8. Centered on optical axis 810 is imaging lens assembly 815, and image sensor 820. Object 805 is sequentially irradiated by different wavelengths or wavelength ranges by radiation source 825, which emits narrowband spectral radiation such as may be generated by a broadband source and narrowband spectral filters or by quasi-monochromatic semiconductor light-emitting diodes (LEDs). The calibration and operation of spectral imager 800 is identical to that of spectral imager 700. In this embodiment, spectral transmission or reflection coefficients may be measured depending on the location of the lighting 825.

In other embodiments (FIGS. 15 and 16), there is focus adjustment of the objective optics 1505, 1605 comprising one or more lenses performed for two or more unique sub-ranges of the entire spectral range of the spectrometer 1510, 1610 respectively. In these embodiments, there is a transmissive (shown) or reflecting grating or a prism (not shown), however there is not a transmissive (or reflective) filter that limits the spectral band being focused and measured. For each unique focus setting, only a subrange (or segment) of the spectral information is in focus on the entrance slit of the instrument and saved. At another focus setting a different range of spectral information is acquired and saved and so on. Later, the spectral information from all subranges/segments may be re-assembled into a larger spectral data set.

In another embodiment (FIGS. 15 and 16), there is focus adjustment of the objective optics 1505, 1605 of the spectrometer 1510, 1610 respectively. The objective optics include one or more lenses. Focus adjustment is performed for each spectral band and where the subranges for focus are defined by the wavelength range of the spectral band limiting filter(s) that are inserted into the optical beam (not shown) before or after the spectrometer entrance slit.

The use of spectral band limiting filters may significantly improve imaging quality by reducing certain types of light scatter including spectral stray light.

In another embodiment and in the case where the sample 705 is illuminated with a spectral band of light, and the filter 730 is restricting the measurement to be of a different spectral region, the spectral imager 700 can be used to measure the fluorescence of the sample 705.

Changing the focus of a lens assembly may change the image magnification by a small but significant amount. This can be compensated for the purposes of image registration by scaling the image both horizontally and vertically. Similarly, small but significant image translation due to mechanical misalignment in the lens assembly may be compensated by image translation horizontally and/or vertically.

Figure 1:
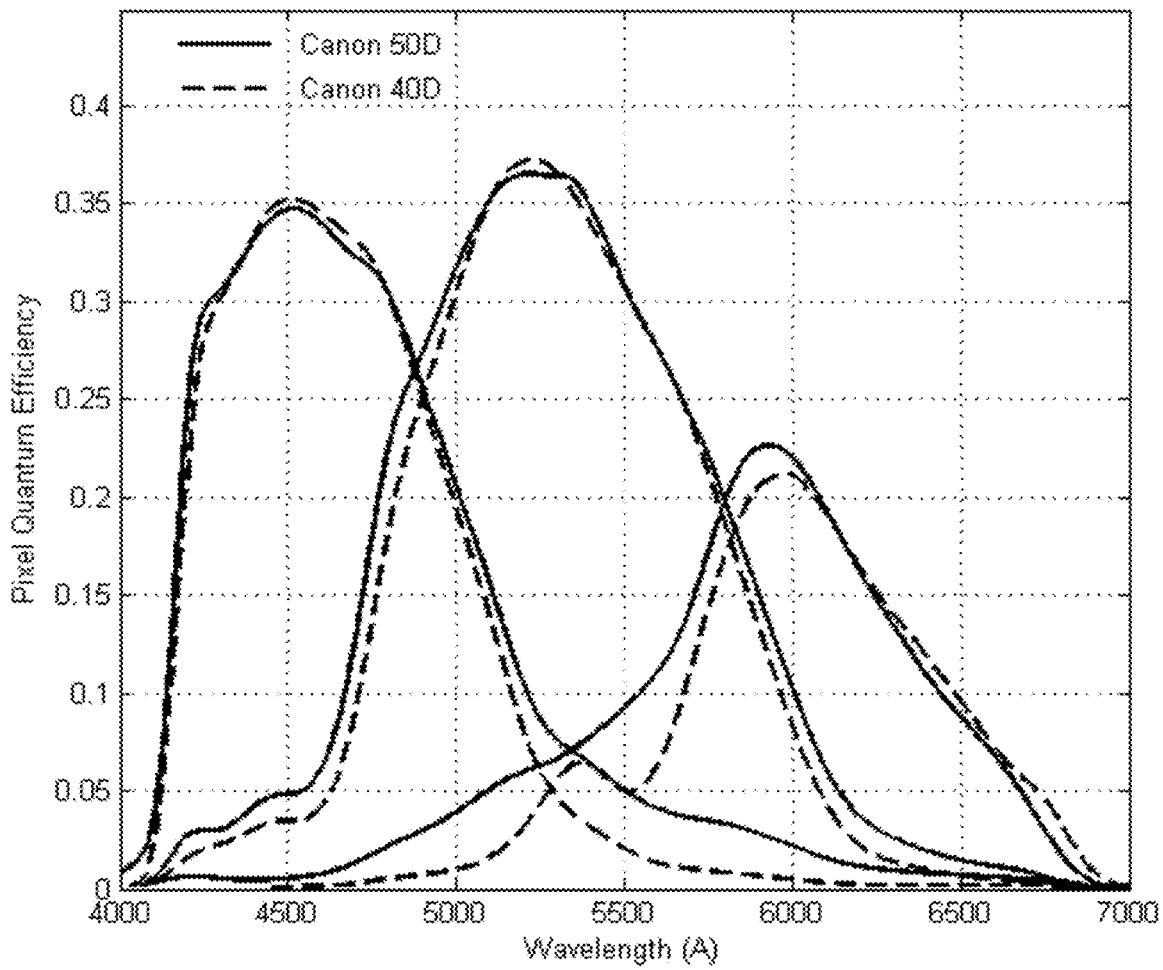
FIG. 1 illustrates prior art RGB spectral responsivities of typical digital color cameras.
Figure 2:
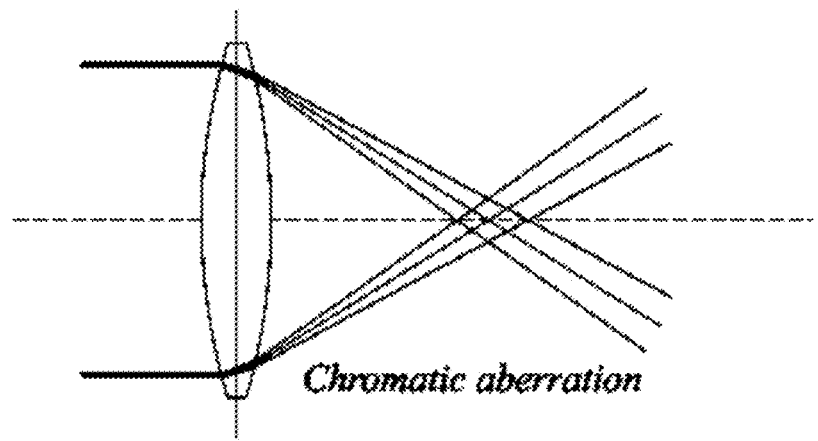
FIG. 2 illustrates prior art effects of chromatic aberration for a simple lens.
Figure 3:
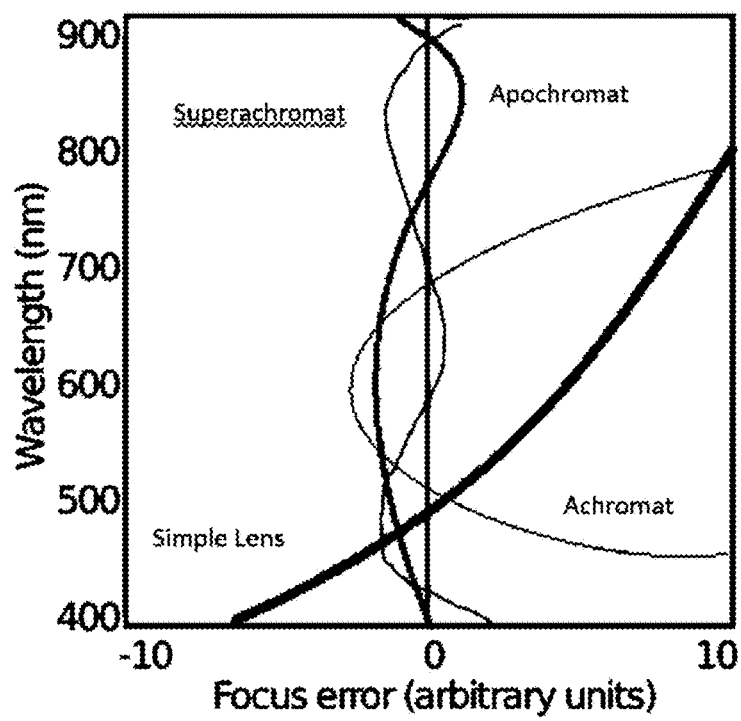
FIG. 3 illustrates prior art focus errors of simple, achromatic, apochromatic, and superachromatic lenses.
Figure 4:
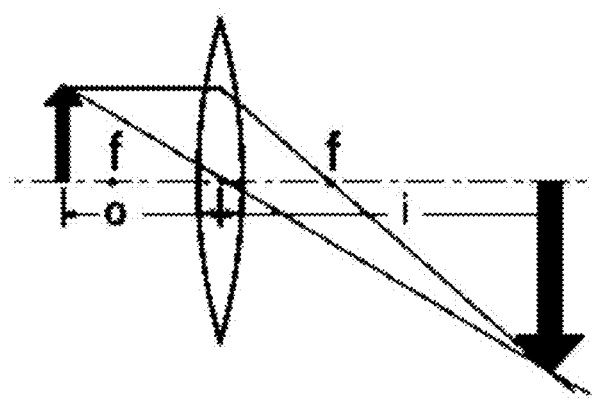
FIG. 4 illustrates the prior art relation between image and object distances and lens magnification.
Figure 5:
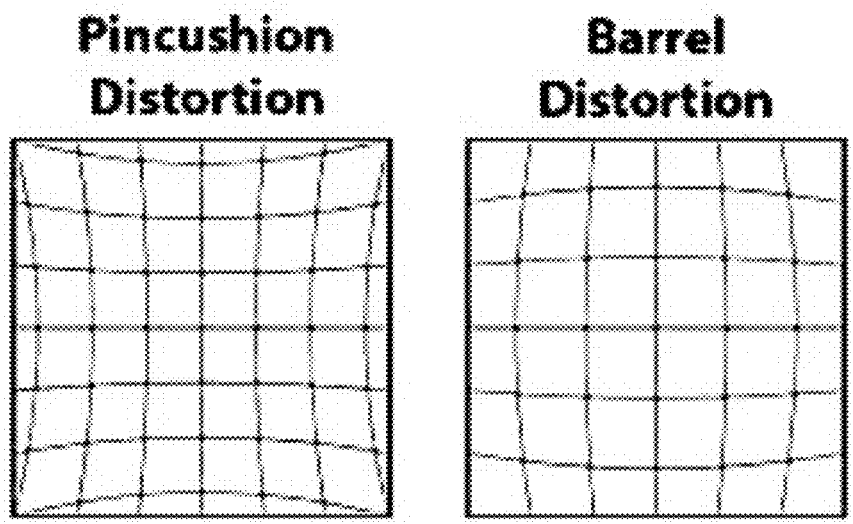
FIG. 5 illustrates prior art pincushion and barrel distortion of imaging lenses.

Lens assemblies may exhibit radial image distortion, including pincushion distortion, barrel distortion, or a combination thereof (FIG. 5). In one model, this radially symmetric distortion can be described by a quartic equation:

$$f(r) = ar^4 + br^3 + cr^2 + d \qquad (2)$$

where r is the Euclidean distance from the center of the optical axis on the sensor and a, b, c, and d are fitted polynomial coefficients. This can be compensated for the purposes of image registration by a radial nonlinear image transformation in accordance with Equation 2. Note that there exist alternate models that can account for radial distortion, such as Brown-Conrady's even order polynomial model, which can be used instead of Equation 2.

Figure 6:
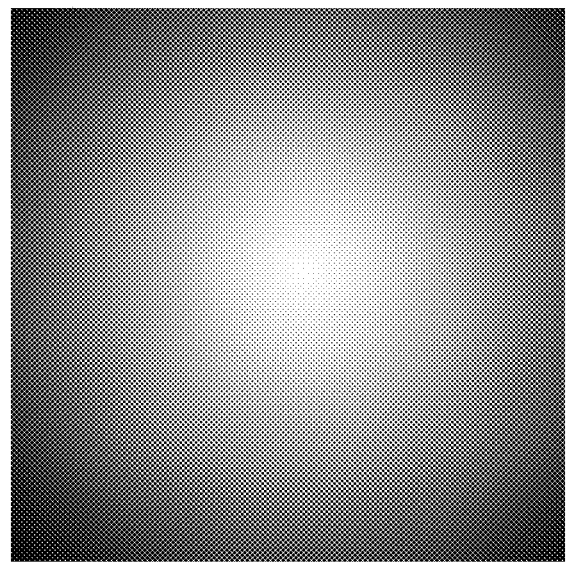
FIG. 6 illustrates prior art vignetting of imaging lenses.

Lens assemblies may further exhibit vignetting, a decrease in image radiance towards the periphery (FIG. 6). This can be compensated for the purposes of image registration using known flat-field image correction techniques.

Sensor arrays may also exhibit variations in sensitivity with wavelength, particularly near the limits of their spectral ranges. This can be compensated for the purposes of image registration by uniformly scaling the pixel values for each spectral band filter or narrowband spectral radiation source.

Changes in image magnification, image translation, radial image distortion, and vignetting may all occur with changes in focus and spectral band filter or narrowband radiation source. The spectral imager, including the lens assembly and sensor array, may therefore be calibrated for each spectral band filter or narrowband spectral irradiant and an enumerated range of lens assembly-object distances, and the focus settings saved in a lookup table. In operation, the lens assembly-object distance is determined and the appropriate focus setting for each filter or irradiant interpolated or extrapolated from the nearest enumerated lens assembly-object distances, and one or more image transformations are applied to ensure that the images can be registered and stacked into a spectral data cube. The spectral data cube is stored in non-transient computer readable memory by a processor, for example.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor may be one or more processing devices that store and make calculations, including an embedded system, a computer such as a desktop or laptop, or smart phone, wherein the more than one processing device may be used for separate functions (one or more device to calculate, and one or more device to store) or the all the functions (one or more device to both calculate and store). The processor performs one or more of the steps in the flowcharts. Connection to the processor may be via a wired or a wireless connection.

Figure 9:
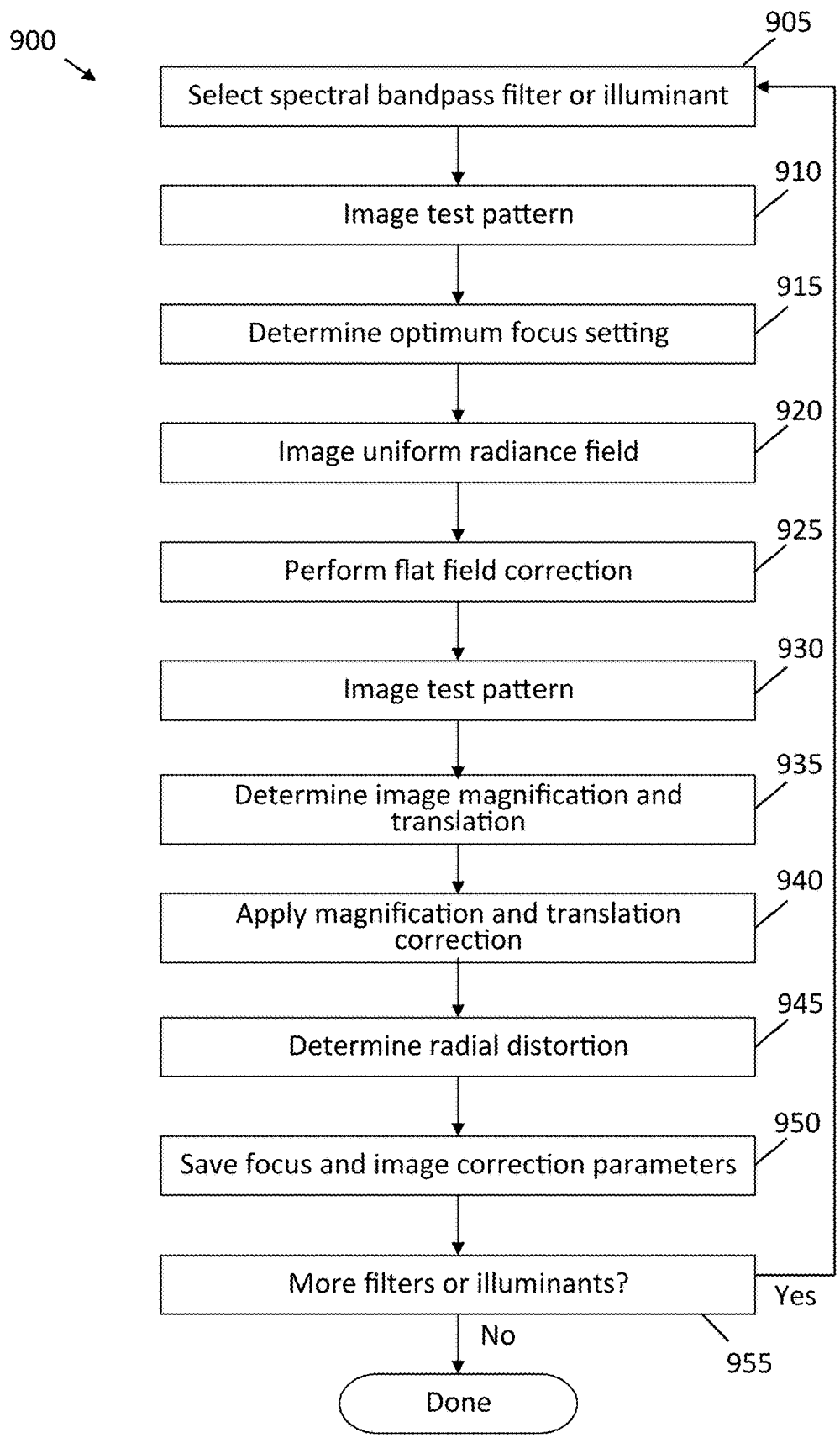
FIG. 9 shows a flowchart for spectral scanning imager calibration, according to an embodiment of the present invention.

FIG. 9 shows a flowchart for the calibration process 900 for a single object-lens distance and for hardware configurations such as in FIGS. 7 and 8. The process steps are repeated for each enumerated object-lens distance.

In step 905, a spectral band filter or narrowband spectral illuminant is selected. In step 910, a high contrast test pattern is imaged, wherein the pattern is designed to determine the focus setting that results in optimum focus.

In step 915, the optimum focus setting for the lens assembly or sensor array is determined. For spectral bands close to or outside the limits of the visible spectrum, an exemplary method of focus determination is to measure the contrast gradients of the test pattern and adjust the focus setting until maximum contrast is achieved. In some embodiments, this method is used to optimize focus for all images regardless of the wavelength. This is a repeatable, quantitative method to optimize focus.

In step 920, a radiance field with a known spatial (absolute or relative) radiance is imaged. The resultant radiance image is then used in step 925 to compute a spatial correction, or "flat field" correction, wherein a multiplier for each pixel value is computed to compensate for sensor array sensitivity variations and image vignetting.

In step 930, another test pattern that is suitable for determining image magnification and translation is imaged. In step 935, the image magnification and translation correction parameters are determined using known optimization methods, such as gradient descent. In step 940, the image is corrected for magnification and translation.

In step 945, radial image distortion is modelled and the function parameters (such as in Equation 2) are determined using an optimization method, such as gradient descent.

In step 950, the focus setting and image correction parameters are saved.

In step 955, flow control returns to step 905 if more filters or illuminants are to be processed; otherwise, the calibration process terminates.

These image correction values for all of the parameters acquired in process 900 may be extended for multiple working distances and saved in a lookup table for referencing for a future measurement. Or, alternatively, the parameters may be modeled as a function of working distance and wavelength range for example. In any case, users could also use interpolation and extrapolation methods and the tabular results for future measurements.

Spectrometers may employ lensed imaging optical systems to focus light into the device. These systems have one lens setting to focus on a scene and one portion of the image is collected onto a limiting aperture in the lens focal plane.

Figure 10:
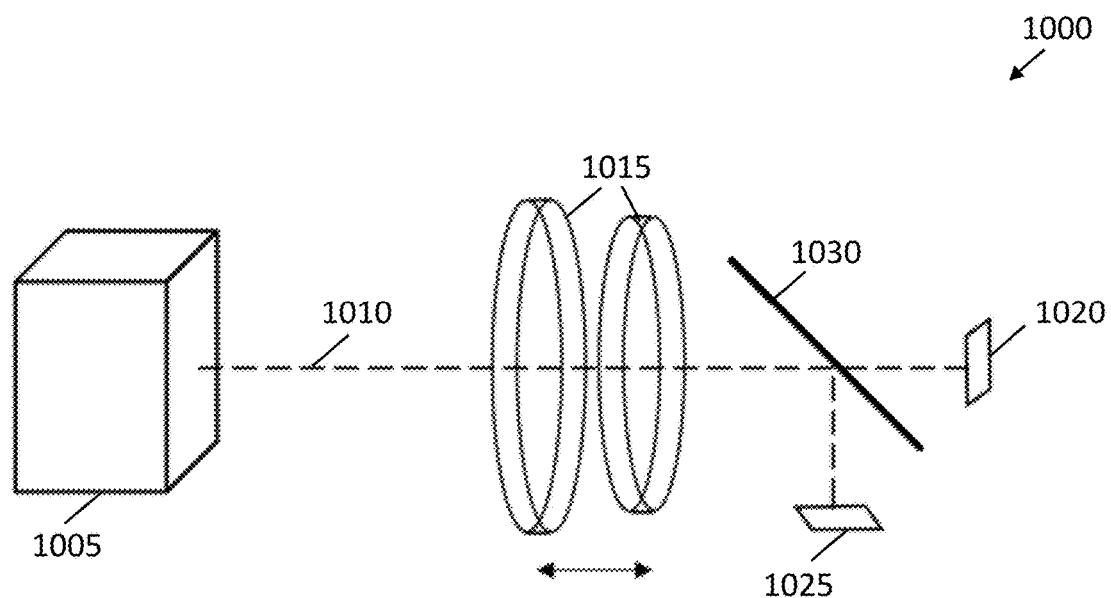
FIG. 10 shows an example of imaging optics for a spot spectrometer with variable focus lens assembly and focus aperture, according to an embodiment of the present invention.

FIG. 10 may be considered to detail imaging optics 1000 for a spot spectrometer with object 1005, variable focus lens 1015 (which may include a plurality of individual lenses) and focal plane 1020, all arranged on optical axis 1010. Focal plane 1020 serves as the entrance aperture for the spectrometer and may be a hole, a slit, a fiber guide, a fiber bundle or any other limiting aperture that couples light into a spectrometer. If the lens 1015 is not apochromatic over the desired wavelength range, then the light will be poorly focused on the aperture 1020 for some wavelengths. This defocusing may also result in less radiation being incident upon the slit, thereby reducing the spectrometer efficiency. Detector (i.e. focusing imager) 1025 is an imaging array detector such as a CCD or CMOS camera to assure the area in 1005 being imaged. 1025 could also be a lens assembly and eyepiece. Component 1030 is an image reflecting device, such as a beam turning mirror or beam splitter, that can divert some or all of the light from the object 1005 to the 2-D array detector 1025. Image reflecting device 1030 may be removable. The positions of focal plane (or aperture) 1020 and detector 1025 can be swapped. The image reflecting device 1030 and focusing 2-D array detector 1025 are not explicitly required in other embodiments for operation of imaging optics 1000. In other embodiments there could be two or more two-dimensional array detectors 1025 using a multiple of mirrored surfaces or multiple translated or rotated mirror positions to image light to those two-dimensional array detector focal planes. There may be other lens elements (not shown) between image reflecting device 1030 and focal plane (or aperture) 1020 or between the 2-D array detector 1025 and image reflecting device 1030.

Figure 11:
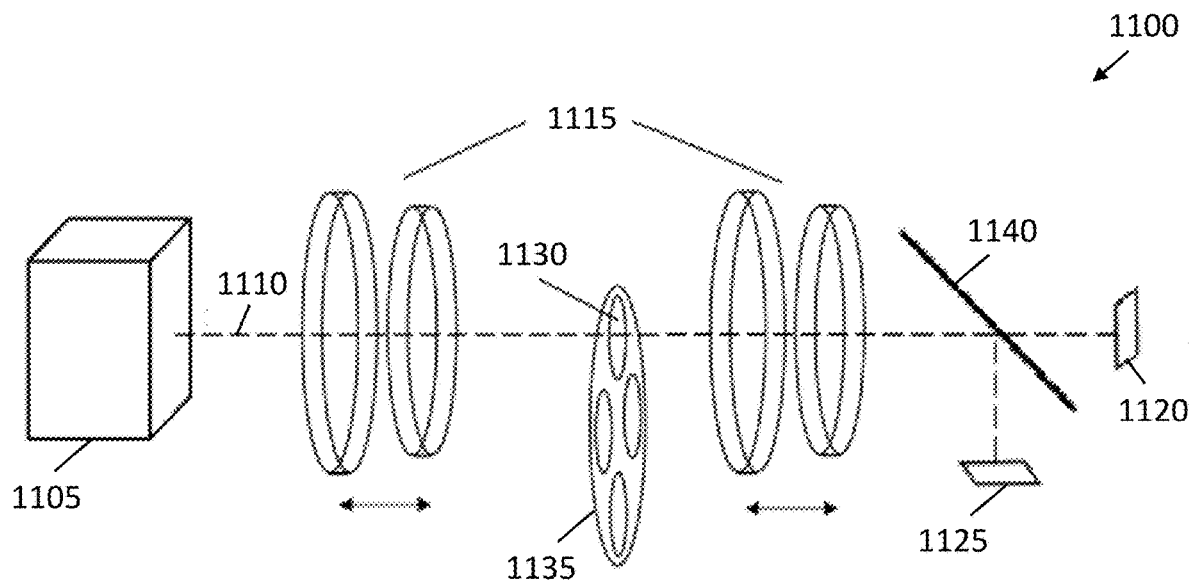
FIG. 11 shows an example of imaging optics for a spot spectrometer with variable focus lens assembly and focus aperture, according to another embodiment of the present invention.

FIG. 11 shows imaging optics 1100 with a variable focus lens assembly 1115, which effectively collimates the light across each filter 1130, in turn, of the filter assembly 1135 and focuses the light onto spectrometer limiting aperture 1120 or 2-D array detector (or focusing imager) 1125. Filter assembly 1135 is a spectral filtering device such as a filter wheel with transparent spectral filters 1130 such as bandpass, long pass or short pass filters. Detector 1125 is an imaging array detector such as an InGaAs, CCD or CMOS camera. Component 1140 is an image reflecting device, such as a beam turning mirror or beam splitter, that can divert some or all of the light to the 2-D array detector 1125. Image reflecting device 1140 may be removable. The positions of aperture 1120 and detector 1125 can be swapped. The image reflecting device 1140 and focusing 2-D array detector 1125 are not explicitly required in other embodiments for operation of imaging optics 1100. In other embodiments there could be two or more two-dimensional array detectors 1125 using a multiple of mirrored surfaces or multiple translated or rotated mirror positions to image light to those two-dimensional array detector focal planes. There are valid configurations (not shown) of this system of imaging optics 1100 where the quantities of lenses in the lens groups of lens assembly 1115, quantity of filter assemblies 1135 and the ordering of the components between the object 1105 and the focal plane (or aperture) 1120 differ from those drawn in 1100.

Embodiments not shown are when the surface of image reflecting device 1140 or 1030 facing the lens assembly 1115, 1015 is mirrored and a hole allows only a limited aperture of light to pass to the detector 1120 or 1020 respectively (U.S. Pat. No. 3,818,198A).

In other embodiments of the imaging optics 1000 and 1100 in FIGS. 10 and 11 respectively, the aperture 1020, 1120 has an equivalent focal point at 1025, 1125. By imaging high contrast objects, it is possible for the focus quality to be assessed by only using a detector at or behind aperture 1020, 1120, however, it is more convenient to use the (focusing) imaging 2-D array detector 1025, 1125 for this purpose. The focus adjustments of the lens 1015, 1115 is performed for two or more unique sub-ranges of the entire spectral range intended to be measured by the spectrometer after aperture 1020, 1120. For example, if the spectrometer can cover the range of 350 nm to 850 nm, and the if lens cannot provide a crisp focus onto the aperture 1020, 1120 for the entire wavelength range, then this method will be used to break the measurement up into sub-ranges where each sub-range has a unique lens focus. Spectral sub-ranges could be 350 nm to 475 nm, 475 nm to 625 nm and 625 nm to 850 nm for example. When focused in the first range, only the measurements from 350 nm to 475 nm will be acquired while any other data is discarded. When focused for the second range, only the measurements from 475 nm to 625 nm will be acquired and so on. The method includes stitching a wide range spectrum from the acquired sequence of narrower spectral range measurements.

One method to ascertain the optimal focus of the imaging optics 1000 as in FIG. 10 over any spectral sub range would be to:
  a. Set a high contrast target at 1005.
  b. Illuminate 1005 with light wavelengths within the spectral subrange.
  c. Adjust the focus of lens 1015 until maximum contrast is observed by the detector at 1025.

In some circumstances (e.g. when a light source that fills the spectral subrange is unavailable), it may also be suitable to choose an illumination that has a much narrower spectral width than the spectral subrange such as using a 550 nm LED light to represent the spectral subrange range 500 to 600 nm, or other light source with narrower spectral width than the spectral subrange, as long as the maximum spectral illumination is near the middle of the spectral subrange range of 500 to 600 nm.

In FIG. 11, spectral band filters may be present in filter assembly 1135. In this case spectral band filtering precedes detector 1125 and focal plane (or aperture) 1120, and the procedure to determine the focus may be as follows:
  a. Set a high contrast target at 1105.
  b. Illuminate 1105 with broadband light covering the entire wavelength range of interest.
  c. Select band limiting filter 1130.
  d. Adjust focus of lens assembly 1115 until maximum contrast is observed by the detector at 1125.

If there is no monitoring imager or eyepiece at the location of detector 1025, 1125, one method to determine focus would be to back-illuminate position of focal plane (aperture) 1020, 1120 with a light source, then look at the projection of the light onto a target at the location of object 1005, 1105. One method to achieve good focus for any sufficiently narrow spectral subrange is:
  a. Set a white diffuse reflection target at the location of object 1005, 1105.
  b. Illuminate focal plane (or aperture) 1020, 1120 with broadband light if there is a band limiting filter 1130 in the path, else illuminate with light wavelengths matching the spectral subrange.
  c. Adjust the focus of lens 1015, 1115 until maximum contrast is observed on the white diffuse target at the location of object 1005, 1105.

Figure 15:
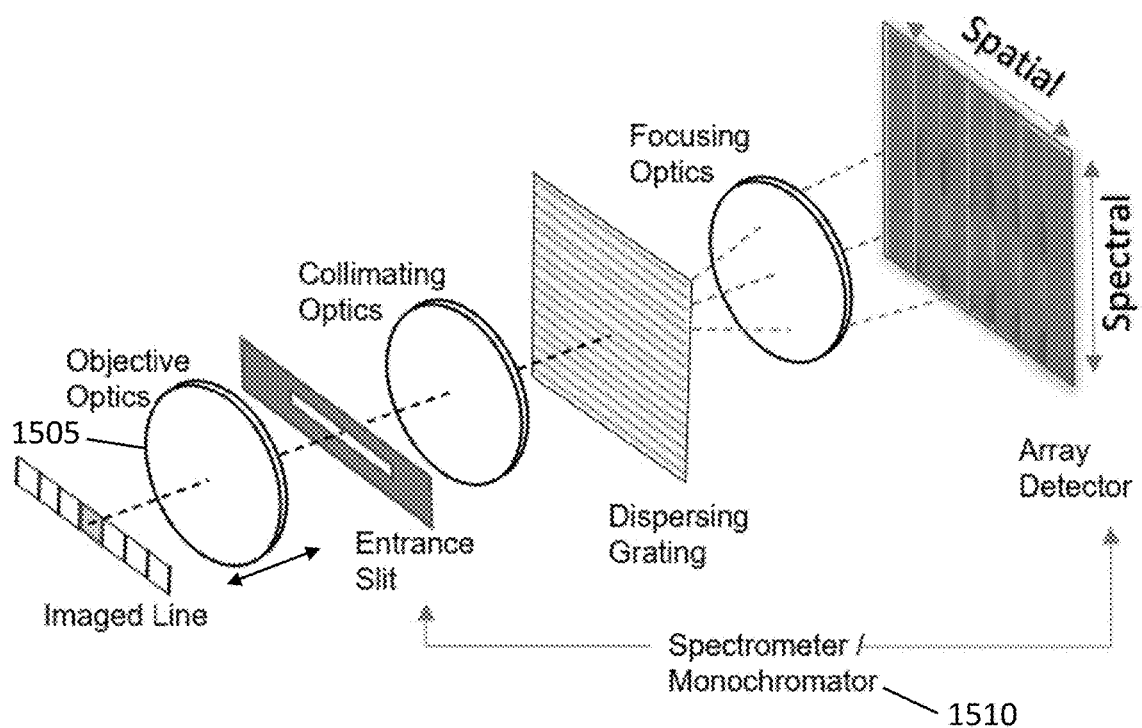
FIG. 15 illustrates an adjustable objective lens used with broom spectrometer technology, according to an embodiment of the present invention.
Figure 16:
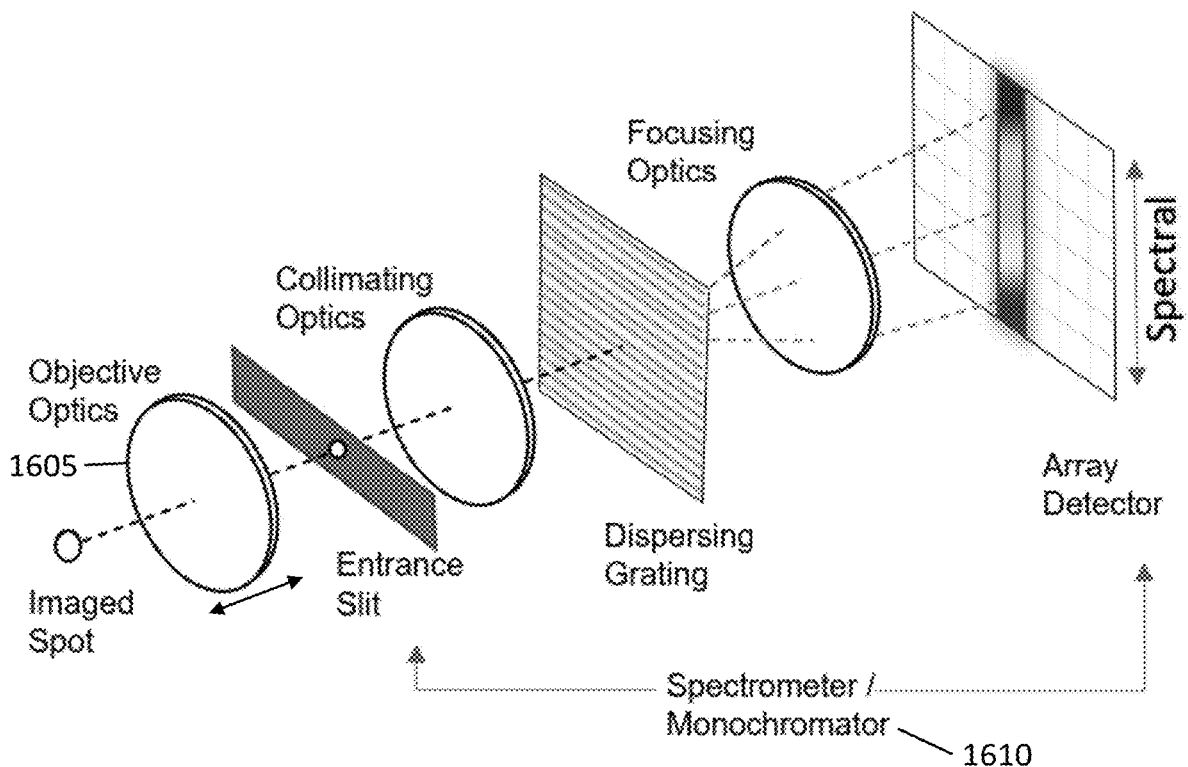
FIG. 16 illustrates an adjustable objective lens used with spot spectrometer technology, according to an embodiment of the present invention.
Figure 17:
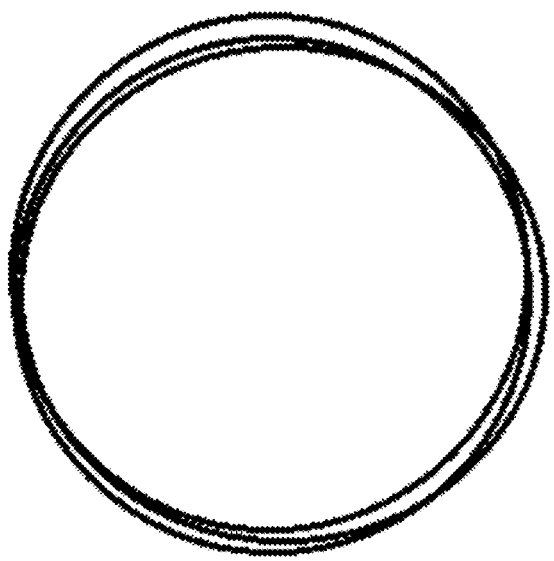
FIG. 17 shows the change in a spectrometer's measurement aperture for three spectral band/subranges (or illuminant) images.

There may be changes in magnification and translation of the image formed at focal plane (or aperture) 1020, 1120. FIG. 15 depicts how the image at focal plane (or aperture) 1020, 1120 could change for different spectral subranges for a circular object 1005, 1105 respectively.

The position of the sensor(s) 1020, 1025, 1120 and 1125 relative to the last optical element, 1015, 1115 could be adjusted in combination with lens focusing to minimize magnification effects. Alternatively, the glass thickness in the various filter positions in 1130 could be varied to adjust the path lengths and compensate for the magnification of each spectral band.

One prior art method to locate the position of the spectrometer aperture in the systems 1000, 1100 of imaging optics is the following:
  a. Focus the objective lens at the desired spectral band (e.g. 475 to 625 nm) and set the display to black.
  b. Draw a line of pixels at maximum luminance starting at the left-hand side of the display.
  c. Measure the integral output of the spectrometer. This first measurement is the baseline value.
  d. Add another line of green to the left-hand side of the display.
  e. Repeat measuring and adding lines until eventually the integral signal starts to rise. One can define the edge of the spectrometer aperture where the value just starts to go up, perhaps at 2% of the maximum value. Note, using the detector 1025, 1125, where this edge is on the display and in pixel space on the monitoring imager.

f. Similarly, by adding lines to a black display from the right-hand side, the bottom and the top, the bounding rectangle of the spectrometer aperture (field of view) is determined.

g. Create and save the shape of the spectrometer aperture so that it just fits inside the bounding rectangle.

Since the detector 1025, 1125 has the same path length from the object 1005, 1105 as the spectrometer slit at focal plane 1020, 1120, when the detector is in focus, the spectrometer will also be in focus. Similarly, if the image formed by the lenses at 1015 and 1115 exhibits translation and/or magnification when focus adjustments are made across a multitude of spectral subranges, the effect will be perfectly observable at the detector 1025, 1125.

Figure 12:
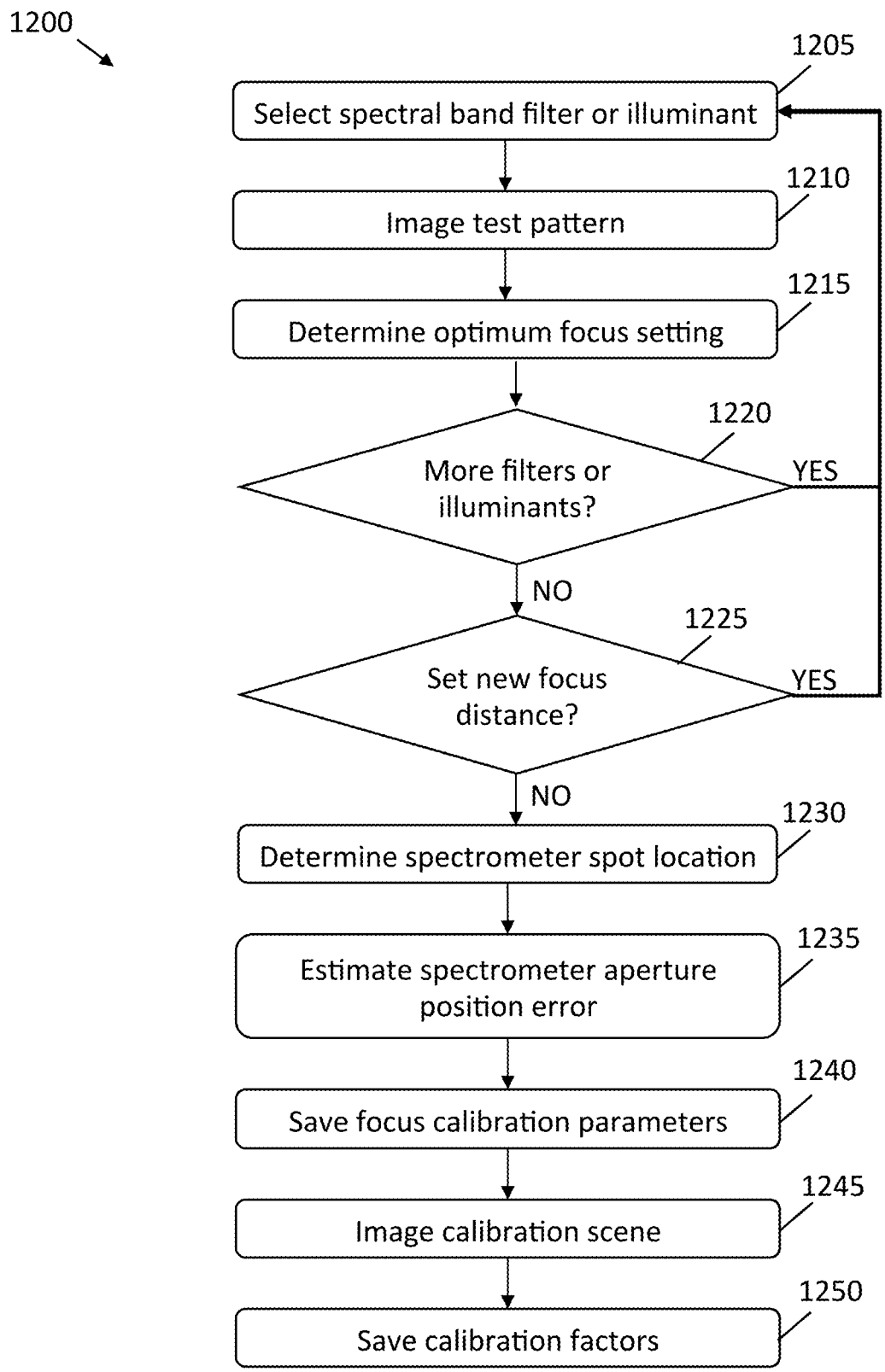
FIG. 12 shows a flowchart for the calibration of a spectrometer that measures the spectrum from a single area and with variable focus imaging optics, according to an embodiment of the present invention.
Figure 13:
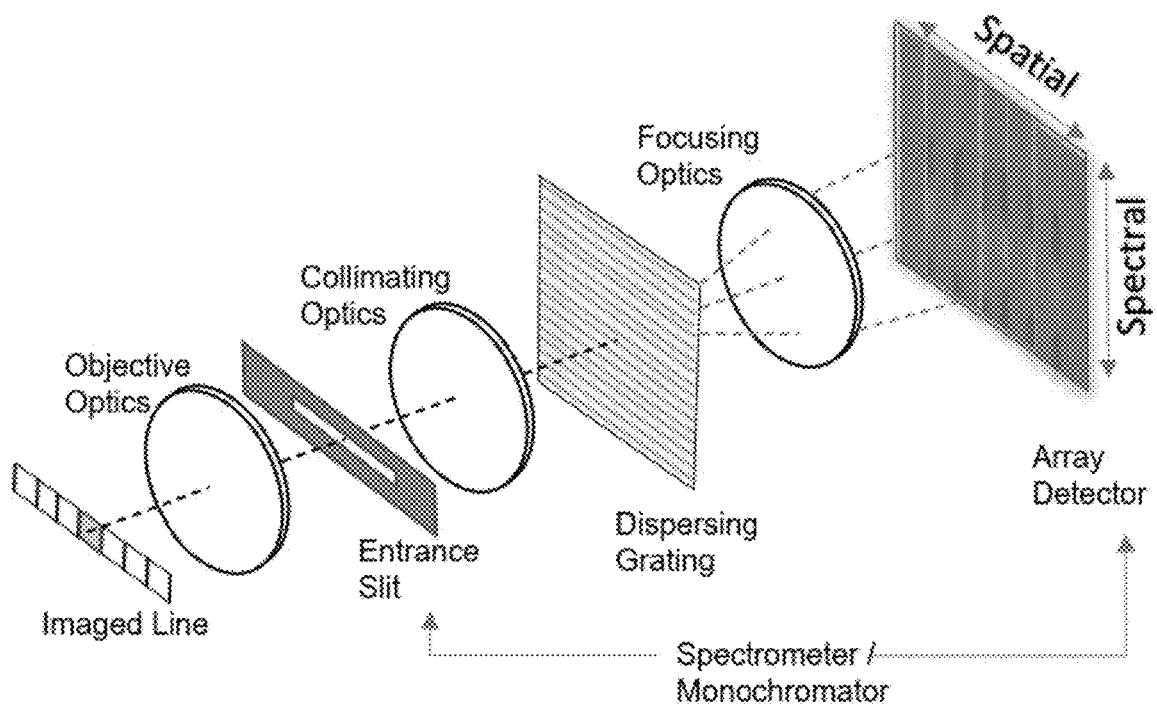
FIG. 13 illustrates prior art push broom spectrometer technology.
Figure 14:
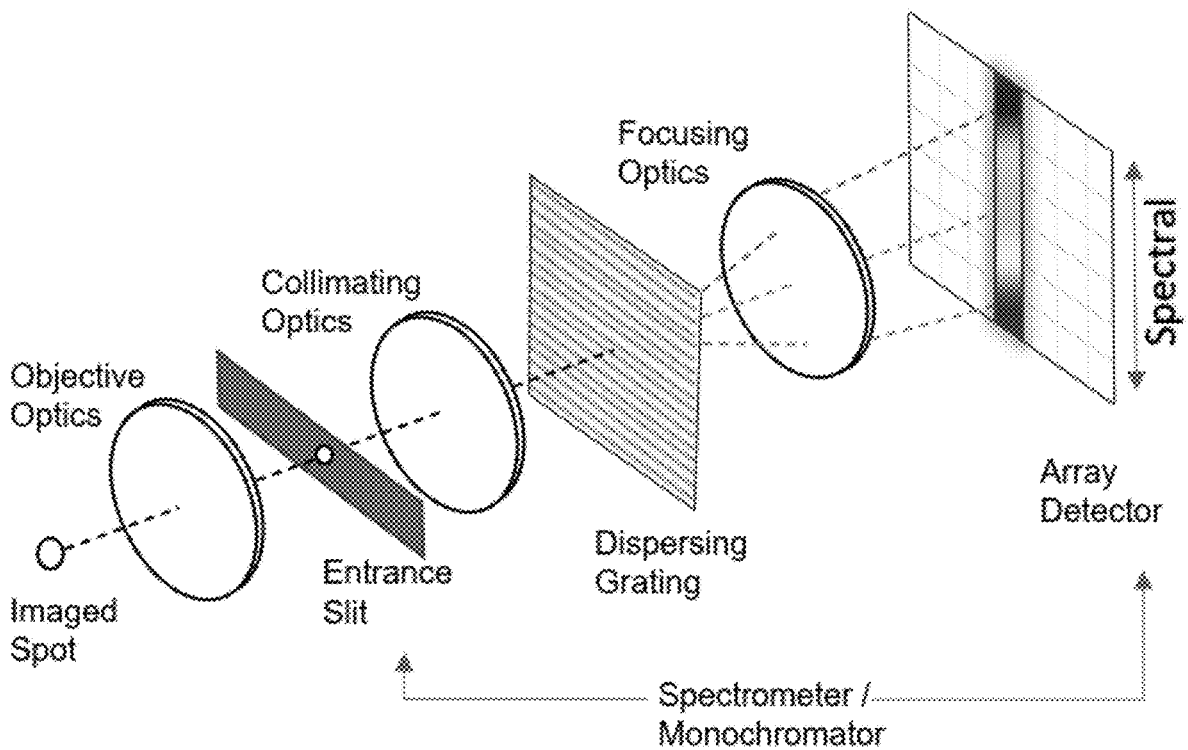
FIG. 14 illustrates prior art spot spectrometer technology.

FIG. 12 shows a flowchart for the calibration process 1200 for imaging optics 1000, 1100 for a spot spectrometer (FIGS. 13 and 14) when the distance to the imaged object is fixed. The process steps are repeated for each enumerated object distance.

In step 1205, a spectral band filter or narrowband spectral illuminant is selected. In step 1210, a test pattern (target) is imaged, wherein the pattern is designed to determine the focus setting that results in optimum focus.

In step 1215, the optimum focus setting for the lens assembly or sensor array is determined and saved. An exemplary method of focus determination is to measure the contrast gradients of the test pattern and manually or automatically adjust the focus setting until maximum contrast is achieved.

In step 1220, if there are more spectral bands to have unique focus go back to 1205, otherwise all spectral subregions at this focus have been tested for the best focus setting and proceed on to step 1225.

Step 1225 directs the process depending on whether a change in the distance between the target and the spectrometer if desired. In this way, a multitude of working distances may be calibrated.

In step 1230, choose one spectral band and one focus distance to set as a reference spot location. Usually the chosen spectral band will be a band at the middle of the complete spectral range. One method to determine the location of the spectrometer aperture is described above. Using software, create and save a "synthetic aperture" that corresponds to the estimated position of the true spectrometer aperture. This aperture is fixed in terms of the detector 1025, 1125 pixels. The method may be repeated for multiple object distances.

In step 1235 the spectrometer aperture position is compared for all spectral subranges at a particular working distance. Create a target in the focal plane of the lens that has the exact same height and width as the spectrometer aperture found in step 1230. Further, the target should be able to emit a spectral range covering the range of the spectrometer (if there are further spectral band filters inserted before the spectrometer slit and the focusing imager) or the target will need to sequentially emit light within the wavelength bands defined in steps 1205-1220 above. Step through the best focus and spectral band filtering combinations to image the target with the detector 1025, 1125. Note the change in size (magnification) and shifting (translation) of the target image for each wavelength subregion imaged. Determine if the consistency is good enough for the intended application. The method may be repeated for multiple object distances.

Data is acquired in steps 1205 through 1235 for the following related variables:
a. object distance
b. lens focus setting
c. spectral band subrange
d. position and size of spectrometer aperture in terms of focusing imager pixels These values may be saved 1240 in a lookup table for referencing for a future measurement. Or, alternatively, functions may be created to describe the dependence of these variables such as spectrometer aperture position and size as a function of working distance; or spectral subrange focus setting as a function of working distance. In any case, users could also use interpolation and extrapolation methods and the tabular results for future measurements.

In step 1245, a target of known absolute or relative quantity such as spectral radiance, spectral irradiance, spectral intensity, spectral transmission or spectral reflectance is imaged.

In step 1250, the measurement from 1245 is compared to the known target value(s) and a scaling correction is saved and may be applied to scale any measurement to the corresponding scale for absolute or relative quantities such as spectral radiance, spectral irradiance, spectral intensity, spectral transmission or spectral reflectance.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. In general, unless otherwise indicated, singular elements may be in the plural and vice versa with no loss of generality. Accordingly, the specification is to be regarded in an illustrative, rather than a restrictive, sense.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. All configurations described herein are examples only and actual ones of such depend on the specific embodiment. Accordingly, the scope of the invention is to be construed in accordance with the substance defined by the appended claims.

CLAIM SUPPORT

Disclosed is a spectral imaging apparatus comprising: a two-dimensional image sensor array located on an optical axis; a variable focus imaging lens assembly with one or more lenses located on the optical axis; and a computer-readable memory; wherein the variable focus imaging lens assembly at an object distance has a different lens focus or zoom setting for each of two or more spectral bands to image a scene onto the two-dimensional image sensor array, the two or more spectral bands forming a complete spectral range used to image the scene; wherein a calibration, comprised of a lens focus or zoom setting and image registration at each spectral band, is stored in the computer-readable memory.

In some embodiments, the calibration is for two or more object distances. In some embodiments, a further lens focus or zoom setting and a further image registration for another object distance are interpolated or extrapolated from the calibration. In some embodiments, lens focus or zoom setting and image registration at each spectral band are stored as a function of object distance.

In some embodiments, the computer-readable memory stores two or more spectral band images that are acquired at two or more object distances and assembled into a computational or z-mapped multispectral image array comprising three spatial dimensions and wavelength.

Also disclosed is a spectral scanning imaging system comprising: a spectrometer that is located to detect light reflected from an optical axis; a variable focus imaging lens assembly with one or more lenses located on the optical axis, wherein the variable focus imaging lens assembly has a different focus setting for each of two or more spectral bands used to image a scene into an entrance aperture of the spectrometer.

In some embodiments, the entrance aperture and a two-dimensional array detector are in focal planes of the adjustable lens assembly via an image reflecting device; and the two-dimensional array detector comprises a CCD, CMOS or InGaAs sensor. In some embodiments, the entrance aperture is a slit. In some embodiments, the entrance aperture is: a circular, oval or rectangular hole; or a fibre guide; or a fibre bundle.

In some embodiments, the spectral scanning imaging system comprises: computer-readable memory configured to store: an image of the scene taken at each of the focus settings with the corresponding spectral band; and either a filter wheel with multiple optical filters each transmitting light within a different one of the spectral bands and each sequentially positionable on the optical axis, the filter wheel located between the scene and the entrance aperture; or a filter wheel with multiple optical filters each transmitting light within a different one of the spectral bands and each sequentially positionable on an optical path within the spectrometer, where the filter wheel is located between the entrance aperture and a detector of the spectrometer; or a tunable filter element located on the optical axis and configured to sequentially transmit light within each of the spectral bands, the tunable filter element located between the scene and the entrance aperture; or a translatable filter assembly with multiple optical filters each transmitting light within a different one of the spectral bands and each sequentially positionable on the optical axis, the translatable filter assembly located between the scene and the entrance aperture; or a light source that sequentially illuminates the scene with light within each of the spectral bands.

In some embodiments, the spectral scanning imaging system comprises computer-readable memory configured to store a calibration comprised of a focus setting for each spectral band and each of multiple object distances. In some embodiments, the focus settings are stored as a function of spectral band and of object distance. In some embodiments, the focus settings are stored as a function of spectral band and a reference "in-focus" spectral band.

Disclosed is a method for calibrating a spectral scanning imaging apparatus comprising, for each spectral range of multiple different spectral ranges that together span a complete spectral range of the spectral scanning imaging apparatus, the steps of: imaging using light within the spectral range, a test pattern onto a two-dimensional image sensor array of the spectral scanning imaging system; determining an optimum focus setting, of a variable focus imaging lens assembly of the spectral scanning imaging system, for the imaging of the test pattern; imaging a uniform radiance field with the spectral scanning imaging system; performing a flat field correction for the spectral scanning imaging system, using the imaging of the uniform radiance field; imaging a further test pattern with the spectral scanning imaging system; determining, using the imaging of the further test pattern, image magnification and translation correction parameters for the spectral scanning imaging system; applying the magnification and translation correction parameters to the spectral scanning imaging system; determining radial distortion correction parameters for the spectral scanning imaging system; and storing, in computer-readable memory, the optimum focus setting, the flat field correction, the image magnification and translation correction parameters, and the radial distortion correction parameters.

Disclosed is a spectral imaging apparatus comprising: a variable focus imaging lens assembly with one or more lenses located on an optical axis, wherein a lens focus of the variable focus imaging lens assembly is changed by adjustment along the optical axis of one or more of the one or more lenses; an optics that provides, downstream of the optics, two image focal planes, which are non-coplanar and of which one is on the optical axis; a two-dimensional image sensor array located at one of the image focal planes; and a computer-readable memory; wherein the variable focus imaging lens assembly has, at an object distance, a different lens focus or zoom setting for each of two or more spectral bands to image a scene onto the two image focal planes, each spectral band being non-overlapping and the two or more spectral bands forming a spectral range used to image the scene; wherein a calibration, comprised of the lens focus or zoom setting for each spectral band, is stored in the computer-readable memory.

We claim:

1. A spectral imaging apparatus comprising:
a variable focus imaging lens assembly with one or more lenses located on an optical axis, wherein a lens focus of the variable focus imaging lens assembly is changed by adjustment along the optical axis of one or more of the one or more lenses;
an optics that provides, downstream of the optics, two image focal planes, which are non-coaxial;
a two-dimensional image sensor array located at one of the image focal planes; and
a computer-readable memory;
wherein the variable focus imaging lens assembly has, at an object distance:
a lens focus or zoom setting for a spectral band to image a scene onto the two image focal planes; and
at least one other lens focus or zoom setting each for at least one other spectral band to image the scene onto the two image focal planes;
wherein all the spectral bands are non-overlapping and all the spectral bands form a spectral range used to image the scene;
wherein a calibration, comprised of the lens focus or zoom setting for each spectral band, is stored in the computer-readable memory.

2. The spectral imaging apparatus of claim 1, wherein the optics provides at least another separate image focal plane.

3. The spectral imaging apparatus of claim 1, wherein the optics is a beam splitter or a mirror.

4. The spectral imaging apparatus of claim 1, comprising an optical filtering component between the variable focus imaging lens assembly and the image focal planes.

5. The spectral imaging apparatus of claim 4, wherein the optical filtering component comprises multiple optical filters each transmitting light within a different one of the spectral bands, wherein each optical filter is sequentially positioned on the optical axis.

6. The spectral imaging apparatus of claim 4, wherein the optical filtering component is:
- a filter wheel with multiple optical filters each transmitting light within a different one of the spectral bands; or
- a translatable filter assembly with multiple optical filters each transmitting light within a different one of the spectral bands.

7. The spectral imaging apparatus of claim 4, wherein the optical filtering component is a tunable filter element configured to sequentially transmit light within each of the spectral bands.

8. The spectral imaging apparatus of claim 1, comprising a light source that sequentially illuminates the scene with light within each of the spectral bands.

9. The spectral imaging apparatus of claim 8, wherein the light source comprises light-emitting diodes.

10. The spectral imaging apparatus of claim 8, wherein the light source comprises a spectrally-filtered broadband source.

11. The spectral imaging apparatus of claim 1, comprising:
- an optical filtering component between the variable focus imaging lens assembly and the image focal planes; and
- a light source that sequentially illuminates the scene with light within each of the spectral bands.

12. The spectral imaging apparatus of claim 11, wherein the light source comprises:
- light-emitting diodes; or
- a spectrally-filtered broadband source.

13. The spectral imaging apparatus of claim 1, comprising a spectrometer having its entrance aperture located at the other of the image focal planes.

14. The spectral imaging apparatus of claim 13, wherein the entrance aperture is:
- a slit; or
- a circular, oval or rectangular hole; or
- a fiber guide; or
- a fiber bundle.

15. The spectral imaging apparatus of claim 1, comprising an optical filtering component between the scene and the image focal planes.

16. The spectral imaging apparatus of claim 1, wherein the two-dimensional image sensor array comprises a CCD (charge-coupled device), CMOS (complementary metal oxide semiconductor) or InGaAs sensor.

17. The spectral imaging apparatus of claim 1, wherein the calibration comprises an image registration correction for at least one of the spectral bands.

18. The spectral imaging apparatus of claim 1, wherein the calibration is for two or more object distances.

19. The spectral imaging apparatus of claim 1 wherein a further lens focus or zoom setting for another object distance is interpolated or extrapolated from the calibration.

\* \* \* \* \*